United States Patent
Liu et al.

(10) Patent No.: US 12,340,825 B2
(45) Date of Patent: Jun. 24, 2025

(54) DFL READER SIGNAL SIDEBUMP IMBALANCE REDUCTION

(71) Applicant: Western Digital Technologies, Inc., San Jose, CA (US)

(72) Inventors: Xiaoyong Liu, San Jose, CA (US); Songzi Wang, Shenzhen (CH); Goncalo Baiao De Albuquerque, San Jose, CA (US); Yukimasa Okada, Cupertino, CA (US); Xiaohai Xiang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/533,533

(22) Filed: Dec. 8, 2023

(65) Prior Publication Data
US 2025/0182782 A1   Jun. 5, 2025

(51) Int. Cl.
*G11B 5/39*   (2006.01)

(52) U.S. Cl.
CPC .......... *G11B 5/3912* (2013.01); *G11B 5/3909* (2013.01); *G11B 5/3932* (2013.01); *G11B 5/3954* (2013.01); *G11B 5/398* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 7,751,156 B2 | 7/2010 | Mauri et al. | |
| 8,611,054 B1 | 12/2013 | Shang et al. | |
| 9,147,410 B2 | 9/2015 | Edelman | |
| 9,280,992 B1 * | 3/2016 | Jiang et al. | G11B 5/3932 |
| 9,384,763 B1 | 7/2016 | Liu et al. | |
| 9,437,224 B2 | 9/2016 | Singleton et al. | |
| 11,170,808 B1 | 11/2021 | Liu et al. | |
| 11,410,690 B2 | 8/2022 | Hu et al. | |

(Continued)

OTHER PUBLICATIONS

T Devolder et al. "Annealing stability of magnetic tunnel junctions based on dual MgO free_layers and Co/Ni based thin synthetic antiferromagnet fixed system", )Department of Electrical Engineering (ESAT), KU Leuven, 3001 Leuven, Belgiumm, Mar. 22, 2017.

*Primary Examiner* — Craig A. Renner
(74) *Attorney, Agent, or Firm* — Patterson + Sheridan, LLP

(57) ABSTRACT

A dual free layer (DFL) read head or reader oftentimes has a sidebump in a signal amplitude vs. cross-track profile plot. The sidebump is a magnetic signal of the reader in response to the magnetic field of magnetic media with finite thickness. The sidebump magnitude is far below the main magnetic signal of the reader and is offset from the center of the track in the cross-track direction. When two sidebumps are present (one on each side of the center of the track), the sidebump should generally and ideally be symmetrically offset in the cross-track direction else there is a negative impact on reader performance. To obtain offset symmetry, a synthetic antiferromagnetic (SAF) shield may be used, magnetic moments of soft bias layers can be adjusted, and spacing between the free layers of the DFL read head and the layers of the soft bias can also be adjusted.

13 Claims, 10 Drawing Sheets

(56) References Cited

U.S. PATENT DOCUMENTS

| | | | |
|---|---|---|---|
| 2010/0067148 A1* | 3/2010 | Tsuchiya et al. .... | G11B 5/3945 360/319 |
| 2010/0079917 A1* | 4/2010 | Miyauchi et al. ... | G11B 5/3912 360/324.12 |
| 2011/0051291 A1* | 3/2011 | Miyauchi et al. ... | G11B 5/3951 360/319 |
| 2011/0279923 A1* | 11/2011 | Miyauchi et al. ... | G11B 5/3912 360/319 |

* cited by examiner

DFL READER SIGNAL SIDEBUMP IMBALANCE REDUCTION

BACKGROUND OF THE DISCLOSURE

Field of the Disclosure

Embodiments of the present disclosure generally relate to a dual free layer (DFL) read head.

Description of the Related Art

The heart of the functioning and capability of a computer is the storing and writing of data to a data storage device, such as a magnetic media drive (e.g., hard disk drive (HDD)). The HDD has a head comprising a reader (e.g., read head) and a writer (e.g., write head) that each have shields that capture stray fields, such as in the read head, or improve field gradient, such as in the write head.

Over the past few years, various magnetic recording methods have been studied to improve the areal density of a magnetic media device. Magnetic heads in HDDs can have a significant effect on the overall performance and reliability of the recording device. Magnetic heads may be designed to achieve specific advantages, such as improved performance.

One example design involves dual free layer (DFL) read heads or readers. In DFL reader operation, the two free layers are individually stabilized longitudinally by an antiferromagnetically coupled (AFC) soft bias (SB) and biased transversally by a permanent magnet or a rear hard bias structure (RHB) structure from the stripe back edge of the sensor. Ideally, the DFL read head has symmetrical offset of sidebump in the output signal as measured in the cross-track direction. However, due to fabrication and geometrical controllability, a symmetrical offset does not always occur. This asymmetric sidebump offset will introduce HDD additional operation complexity especially during shingle magnetic recording (SMR).

Therefore, there is a need in the art for an improved DFL read head.

SUMMARY OF THE DISCLOSURE

A dual free layer (DFL) read head, or more generally, any reader oftentimes has a sidebump in a signal amplitude vs. cross-track profile plot. The sidebump is an out of phase magnetic signal of the reader in response to the magnetic field of magnetic media with a finite thickness. The sidebump has a magnitude far below the main magnetic signal of the reader and is generally offset from the center of the reader in the cross-track direction. The sidebump presence indicates that the magnetic signal of the reader is a little out of phase. When a pair of sidebumps is present (one on each side of the center of the track), the sidebumps should generally and ideally be symmetrically offset in the cross track direction, or else there is a negative impact on reader performance especially during SMR operation. To obtain offset symmetry, a synthetic antiferromagnetic (SAF) lower shield may be used, magnetic moments of soft bias layers can be adjusted, and spacing between the free layers of the DFL read head and the layers of the soft bias can also be adjusted.

In one embodiment, a magnetic read head comprises: a synthetic antiferromagnetic (AFM) (SAF) shield; a first free layer disposed over the SAF shield; a barrier layer disposed on the first free layer; a second free layer disposed on the barrier layer; a soft bias structure disposed laterally, in a cross-track direction at a media facing surface (MFS), adjacent the first free layer and the second free layer; a rear bias structure recessed from the MFS; and a second shield disposed over the second free layer and the soft bias structure.

In another embodiment, a magnetic read head comprises: a first shield; a first free layer disposed over the first shield; a first insulating layer disposed on the first free layer; a second free layer disposed on the first insulating layer; a soft bias structure disposed laterally, in a cross-track direction at a media facing surface (MFS), adjacent the first free layer and the second free layer, wherein the soft bias structure includes: a first soft bias layer having a first magnetic moment; and a second soft bias layer having a second magnetic moment different from the first magnetic moment; a rear bias structure recessed from the MFS; and a second shield disposed over the second free layer and the soft bias structure.

In another embodiment, a magnetic read head comprises: a first shield; a first free layer disposed over the first shield; a first insulating layer disposed on the first free layer; a second free layer disposed on the first insulating layer; a soft bias structure disposed laterally, in a cross-track direction at a media facing surface (MFS), adjacent the first free layer and the second free layer, wherein the soft bias structure includes: a first soft bias layer spaced a first distance from the first free layer; and a second soft bias layer spaced a second distance from the second free layer, wherein the second distance is different from the first distance; a rear bias structure recessed from the MFS; and a second shield disposed over the second free layer and the soft bias structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A dual free layer (DFL) read head or, more generally, any reader oftentimes has a sidebump in a signal amplitude vs. cross-track profile plot. The sidebump is an additional magnetic signal of the reader in response to the magnetic field of magnetic media with a finite thickness. The sidebump magnitude is far below the magnetic signal of the reader and is offset from the center of the reader in the cross-track direction. The sidebump presence indicates that the magnetic signal of the reader is a little out of phase. When a pair of sidebumps is present (one for each side of the center of the track), the sidebumps should generally and ideally be symmetrically offset in the cross-track direction else there is a negative impact on reader performance. Such offset asymmetry can often occur in DFL. To obtain offset symmetry, a synthetic antiferromagnetic (SAF) shield may be used, magnetic moments of soft bias layers can be adjusted, and spacing between the free layers of the DFL read head and the layers of the soft bias can also be adjusted.

Figure 1:
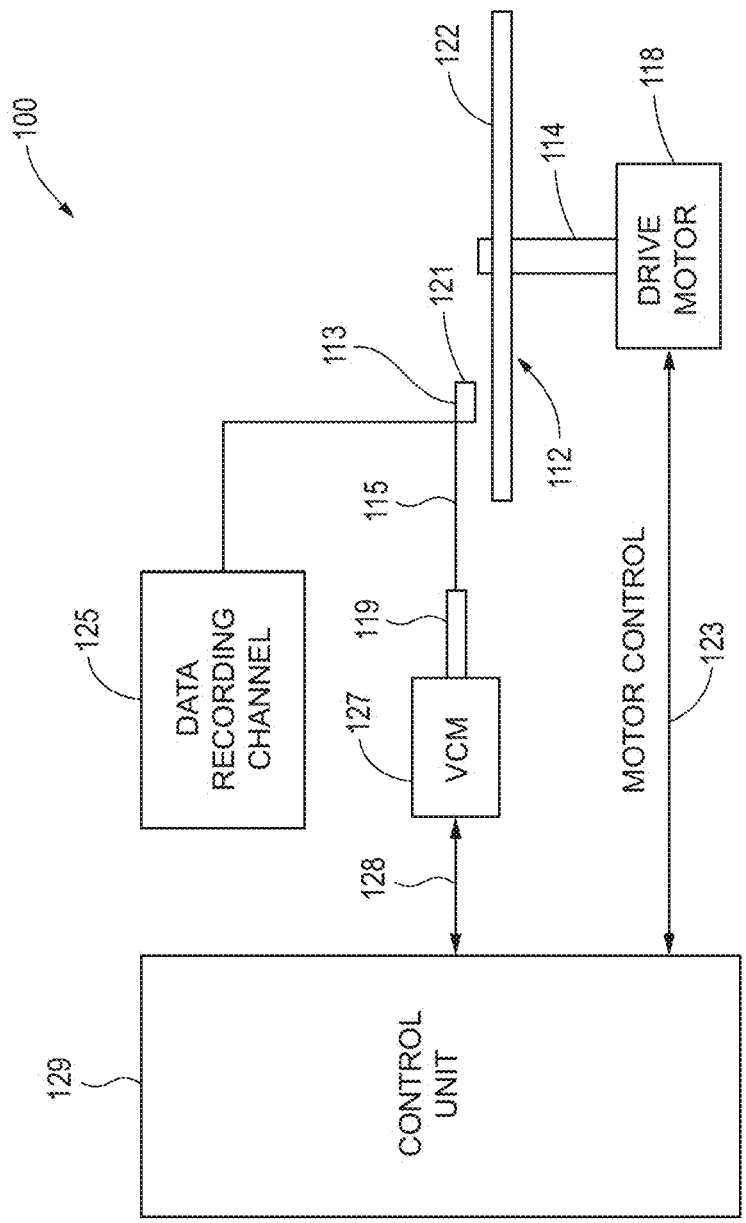
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a HDD. Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
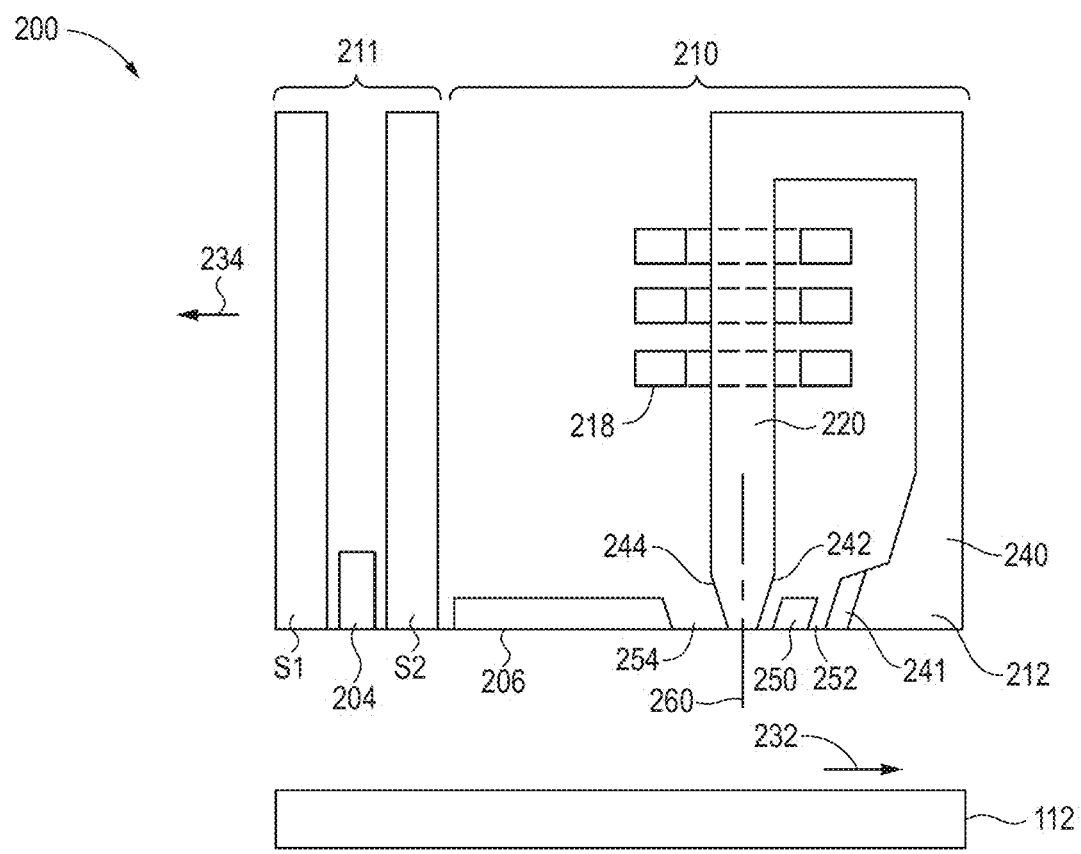
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such as an element exerting a tunneling magneto-resistive (TMR) effect, a magneto-resistance (GMR) effect, an extraordinary magneto-Resistive (EMR) effect, a spin orbit torque (SOT) effect or a spin torque oscillator (STO)

effect. The magnetic fields of magnetized regions in the rotatable magnetic disk 112, such as perpendicular recorded bits or longitudinal recorded bits, are detectable by the sensing element 204 as the recorded bits. Here, magnetic read head 211 is a simplified representation of the various disclosed embodiments which will include multiple sensing elements and shields as further described below.

The head assembly 200 includes a write head 210. In one embodiment, which can be combined with other embodiments, the write head 210 includes a main pole 220, a leading shield 206, and a trailing shield (TS) 240. The main pole 220 serves as a first electrode. Each of the main pole 220, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254. A trailing gap 252 is present between the main pole 220 and the TS 240. As shown in FIG. 2, one or more structures 250 for energy assistive writing may be present in the trailing gap 252. Alternatively, in heat assisted magnetic recording (HAMR), a near field transducer (NFT, not shown) may be disposed near the main pole 220, with the NFT coupled to a waveguide coupled to a light source, to provide localized heating to the media to lower its coercivity for assistive writing.

Figure 3A:
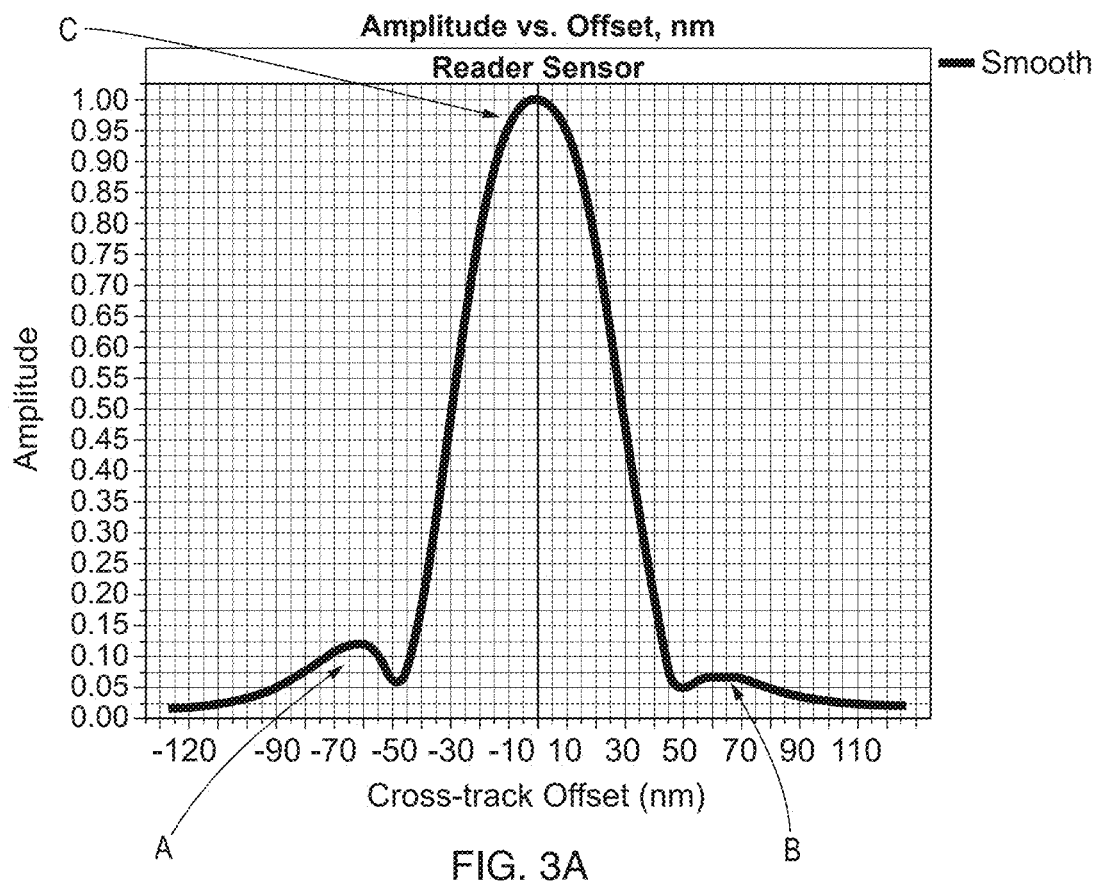
FIG. 3A is a graph illustrating sidebump offsets in cross-track direction according to one embodiment.
Figure 3B:
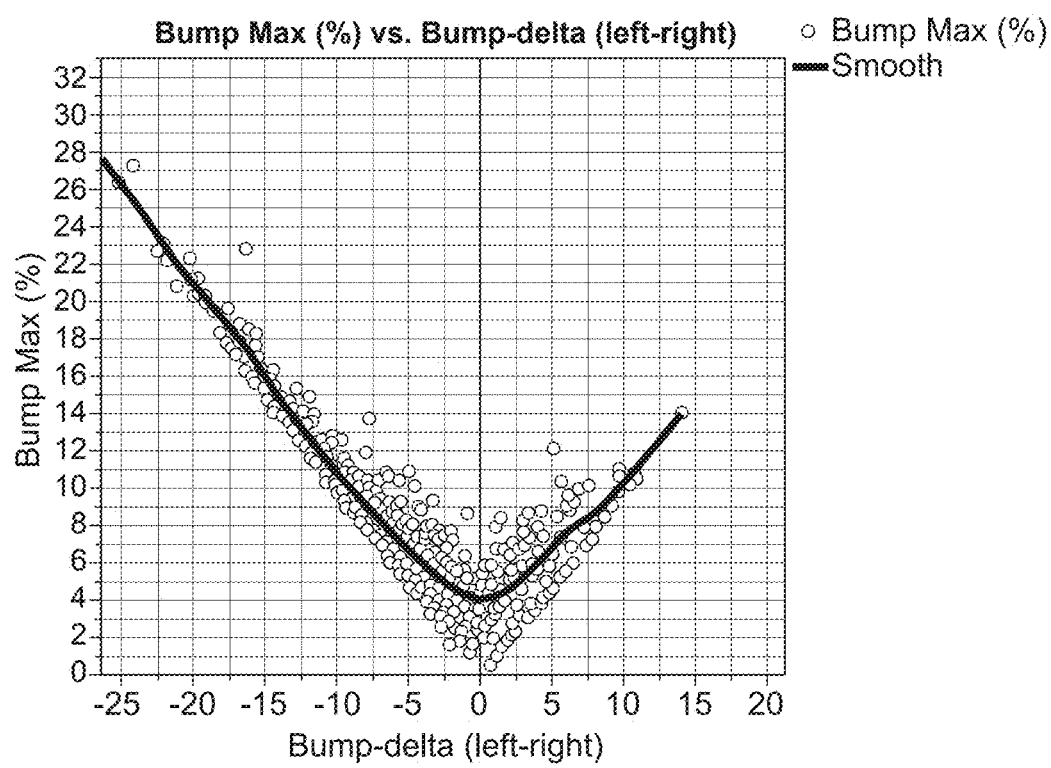
FIG. 3B is a graph illustrating the sidebump maximum versus the sidebump delta.

FIG. 3A is a graph illustrating sidebump profiles according to one embodiment by plotting reader signal output as a function of cross track location. Signal here is normalized to the maximum amplitude at track center. There are generally two out-of-phase signals (sidebumps) peaks at left and right side of main signal peak (position C). Large sidebumps have a negative impact upon read head performance. A DFL sidebump is generally asymmetric between the left sidebump A and the right sidebump B as shown in FIG. 3A. The left sidebump A has an amplitude shown to be about 12.5% of the amplitude peak at a cross-track offset of between about −50 nm and about −80 nm while the right sidebump B has an amplitude shown to be about 7.5% of the amplitude peak at a cross-track offset of between about 50 nm and about 80 nm. C is the main signal. The sidebump maxima is defined as the largest sidebump of either left or right bump magnitude and the sidebump delta is defined as amplitude (normalized) difference between left and right bumps. FIG. 3B is a graph illustrating the sidebump maximum versus the sidebump delta. As shown in FIG. 3B, the imbalance of the two sidebumps, in terms of amplitude difference, correlates well to the maximal sidebump of A and B. Reducing the sidebump imbalance should result in maximal sidebump reduction. In this particular example, the majority of the sidebumps occur to the left of center.

Figure 4A:
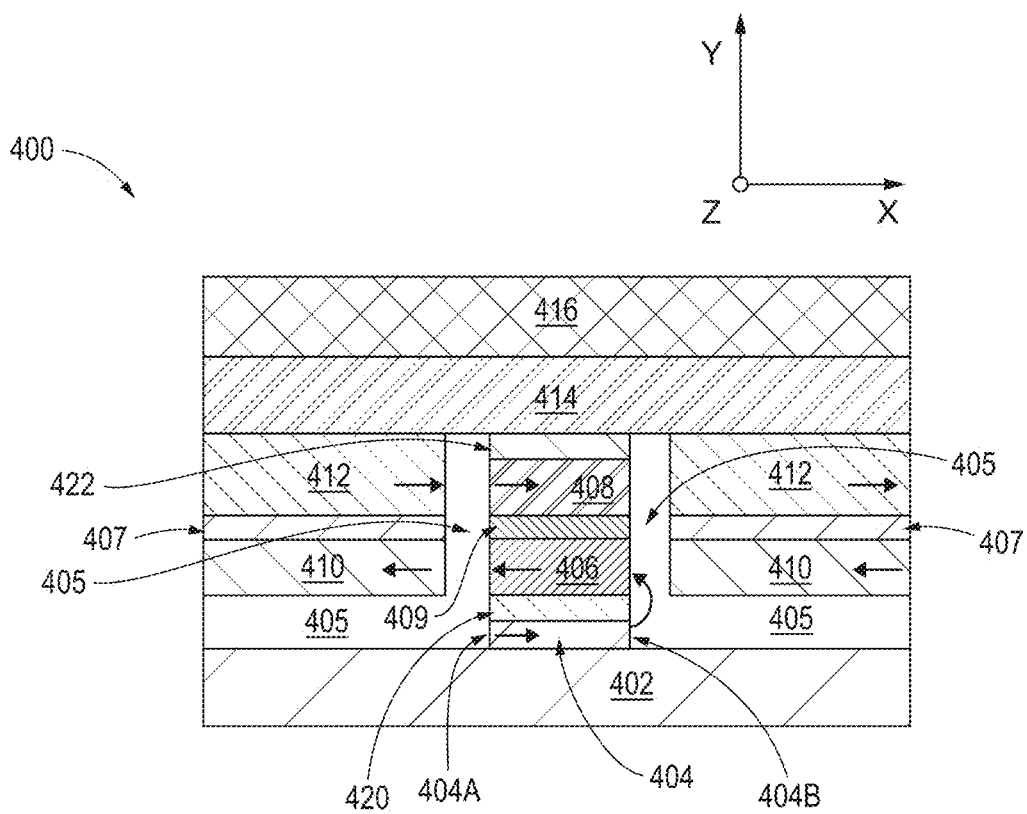
FIG. 4A is a schematic media facing surface (MFS) view of a read head.

FIG. 4A is a schematic MFS view of a DFL read head 400. The read head 400 includes a main shield or bottom shield 402 which may be referred to as a magnetic seed layer. The bottom shield 402 in some embodiments includes a notch 404. The notch 404 is present due to fabrication conditions such as defining the DFL layers. Suitable materials for the bottom shield 402 include a magnetic material, such as CoFe, CoFeNi, NiFe, or FeNiRe, CoB, CoHf or other suitable magnetic materials.

Over the notch 404, the layers of the DFL sensor are disposed. Specifically, a first free layer 406 is present as is a second free layer 408. The first free layer 406 is spaced from the notch 404 by a non-magnetic buffer layer 420. Suitable materials for buffer layer 420 include Ta, Ru, CoHf, NiFeTa, NiFeGe, RuAl, NiAl, and combinations thereof. Suitable materials for the first free layer 406 and the second free layer 408 comprise may each individually comprise cobalt iron (CoFe), cobalt boron (CoB), cobalt iron boron (CoFeB), cobalt hafnium (CoHf), cobalt iron hafnium (CoFeHf) and combinations thereof. The first free layer 406 is separated from the second free layer 408 by a barrier layer 409 that comprises an insulating material such as MgO, SiOx, SiNx, AlOx, HfOx, TiOx, and combinations thereof, where x is bigger than 1. On top of the second free layer 408 and in contact with the upper shield 414 is a capping layer 422. The capping layer 422 comprises non-magnetic material such as Ta, Ru, Ti, CoHf, NiFeTa, NiFeGe, RuAl, NiAl, and combinations thereof.

A soft bias structure comprising a first soft bias layer 410 and an antiferromagnetically coupled (AFC) layer 407 formed thereon, and a second soft bias layer 412 formed on the AFC layer 407 is also present. Suitable materials for the first soft bias layer 410 and second soft bias layer 412 include NiFe, NiFe/CoFe laminates, NiFe/NiFeCr laminates, or NiFe/W laminates, for example ("/" as used here denotes separate layers in a multi-layer stack). Suitable materials for the AFC layer 407 include Ru or a CoFe/Ru/CoFe tri-layer structure. The soft bias structure is spaced from the layers of the DFL sensor along the cross track direction (X direction), and also from bottom shield/notch 402 along the down track direction (Y direction), by insulating material 405. The soft bias structure is in contact with upper shield 414.

An upper shield 414 is disposed above both the soft bias structure and the second free layer 408. On top of the second free layer 408, there can exist a cap layer 422, this cap layer can be include Ta, Ru, Ti, CoHf, NiFeTa, NiFeGe, RuAl, and NiAl, and combinations thereof. The upper shield 414 comprises NiFe, NiFe/CoFe laminates, NiFe/NiFeCr laminates, NiFe/W laminates, CoFe, CoFeNi, NiFe, or FeNiRe, or other suitable magnetic materials. Sometimes, an AFC coupled structures can be implemented in upper shield 414.

On the upper shield 414 is disposed an antiferromagnetic magnet 416 comprising IrMn, IrCrMn, or combinations thereof for example.

The sidebump signal imbalance issue of this read head 400 is now further explained. As shown by the matching direction of the arrows to the −X direction, the first soft bias layer 410 biases the first free layer 406 in a first direction (−X). Conversely, the second soft bias layer 412 biases the second free layer 408 in a second direction (+X) opposite the first direction. Typically, the bias applied by the first soft bias layer 410 is equal (and opposite) to the bias applied by the second soft bias layer 412. In fact, if the notch 404 were not present, equal and opposite bias applied by the respective soft bias layers should result in less sidebumps and at very least, symmetrical sidebumps. With the notch 404 being present, FIG. 4A shows that the notch has surface edges 404A/404B that contribute fringe fields (shown as a curved arrow from notch 404 to free layer 406) that is additive to the first free layer 406 biasing. Effectively, the notch 404 creates a higher first free layer 406 bias, such that the bias of the first free layer 406 is greater than the bias of the second free layer 408.

Figure 4B:
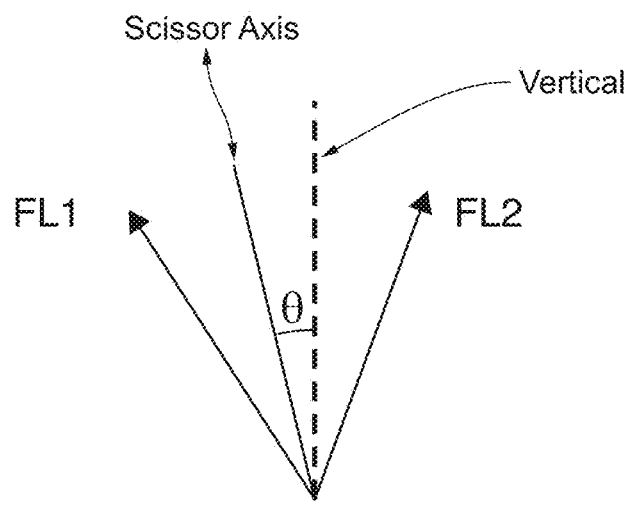
FIG. 4B is a schematic illustration of a scissor axis offset for the read head of FIG. 4A.

FIG. 4B is a schematic illustration of a scissor axis offset for the read head 400 of FIG. 4A. "Scissor" refers to the conceptual figure or shape resulting from relative magnetizations of the two free layers. Due to the bias difference, the scissor axis (θ) tilts away from vertical direction (Z). As a result, the magnetization offset angles from vertical axis will be different for the first free layer 406 (labeled as FL1) and the second free layer 408 (labeled as FL2), and this will lead to different magnetic torque from magnetic media field when reader moves to the left and right side of written track and hence a corresponding asymmetric sidebumps occurring as well as a higher maximal bump (See FIGS. 3A and 3B). This difference is due to the fact that the fringe magnetic fields from the notch 404 are added to the bias provided by the first soft bias layer 410. Due to the fact that the second free layer 408 is biased only from the second soft bias layer 412, the first free layer 406 bias is greater than the second free layer 408 bias. It should additionally be noted that the bias provided by the first soft bias layer 410 to the first free layer 406 is substantially equal to and opposite to the bias provided by the second soft bias layer 412 to the second free layer 408. There is a necessity to properly design a reader structure to achieve vertical scissor axis and hence symmetric/equal biasing for the first and second free layers.

Figure 5A:
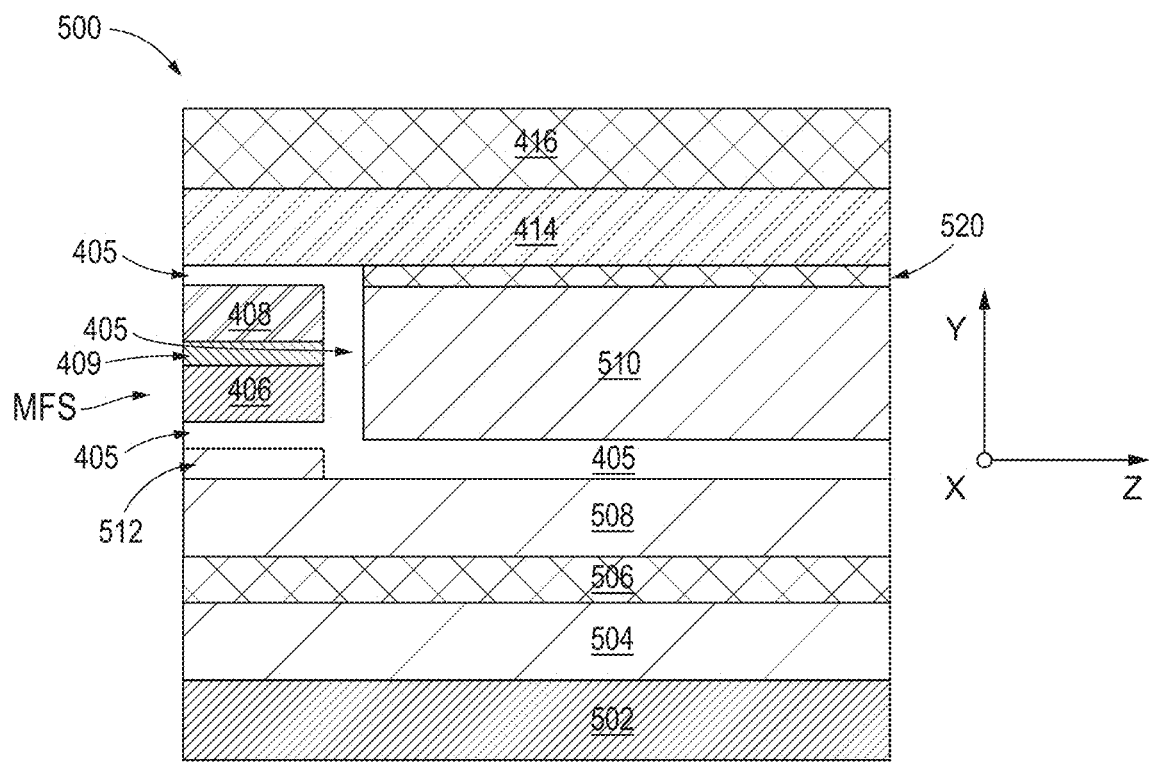
FIG. 5A is an apex view of a read head according to one embodiment.
Figure 5B:
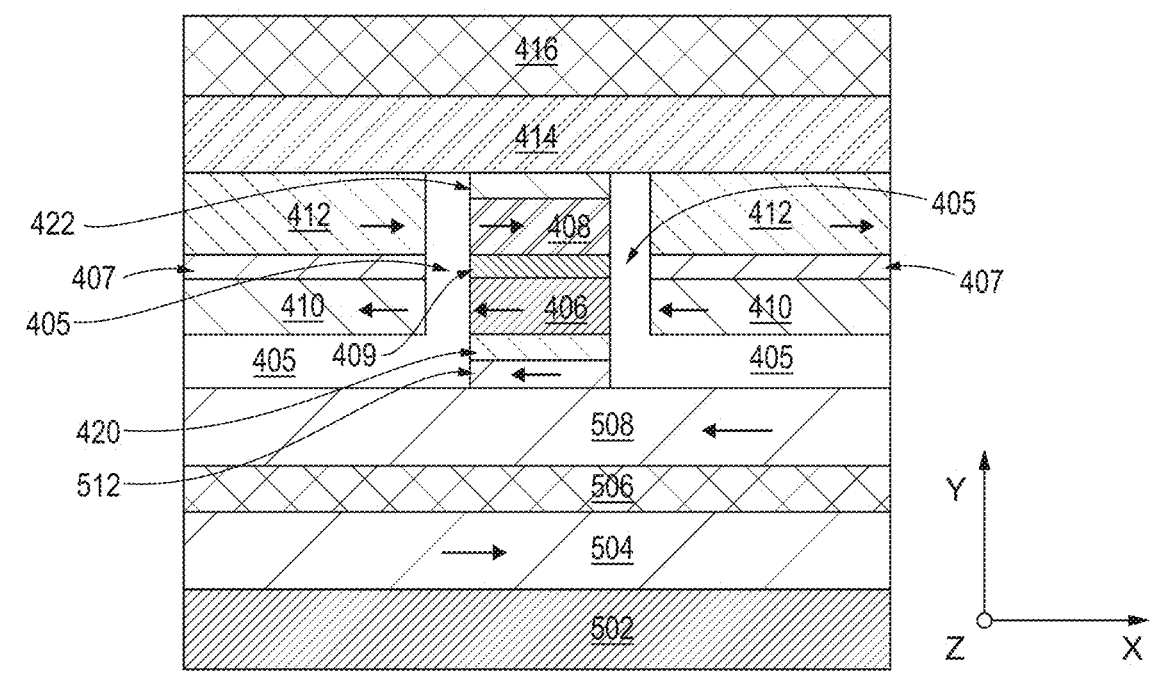
FIG. 5B is an MFS view of the read head of FIG. 5A.

FIG. 5A is an apex view of a read head 500 according to one embodiment. FIG. 5B is an MFS view of the read head 500 of FIG. 5A. Rather than having a traditional lower shield or bottom shield or magnetic seed layer as shown in FIG. 4A, the read head 500 includes a pinned synthetic antiferromagnetic (AFM) (SAF) shield. The SAF shield comprises an AFM layer 502 that comprises IrMn, IrCrMn, or combinations thereof for example. The SAF shield also includes a first magnetic seed layer 504, an AFM coupling (AFC) layer 506, and a second magnetic seed layer 508 having a notch 512. Suitable materials for the first magnetic seed layer 504 and the second magnetic seed layer 508 include NiFe, CoFe, Co and/or combinations thereof. Suitable materials for the AFC layer 506 include a CoFe/Ru/CoFe trilayer, or a Ru single layer. As shown in FIG. 5A, a rear hard bias structure 510 is also present and disposed over the second magnetic seed layer 508. Suitable materials for the rear hard bias structure 510 include CoPt, NiFe, CoFe, and combinations thereof. The rear hard bias structure 510 is both recessed from the MFS and behind the first free layer 406 and the second free layer 408. The rear hard bias structure 510 is spaced from the second magnetic seed layer 508, the first free layer 406, and the second free layer 408, by insulating material 405. The rear hard bias structure 510 is spaced from the upper shield 414 by a non-magnetic layer 520 that may be an insulating material or simply a non-magnetic, non-insulating material. As shown in FIG. 5B, the notch 512 is disposed below the first free layer 406 and the second magnetic seed layer 508 is disposed below the first soft bias layer 410.

As a result of the pinned SAF shield, the second magnetic seed layer 508 and notch 512's orientation is pinned in an orientation that matches that of the first free layer 406, as shown by the direction of the matching arrows in FIG. 5B. In the pinned SAF shield, the first magnetic seed layer 504 is pinned in the +X direction, and the second magnetic seed layer 508 is pinned in the −X direction. As before, the first free layer 406 is biased in the −X direction by the first soft bias layer 410, and the second free layer is biased in the +X direction by the second soft bias layer 412. The pinning of the second magnetic seed layer 508 (and hence notch 512) in the same orientation as that of the first free layer 406 eliminates the fringe field additive effect that occurs in FIG. 4A, and sometimes can even introduce some subtractive effect. Hence, the biasing of the first free layer 406 can be substantially reduced, and more closely matched with the opposite biasing of the second free layer 408 by the second soft bias layer 412. In so doing, the sidebumps shown in FIG. 3A, if existing at all, will be substantially identical in both amplitude and location in the cross track direction. It should be noted that the various magnetization orientations in FIG. 5B and other figures below are intended to illustrate the concepts and that, as a whole, they can be oppositely oriented while maintaining the same reduction of sidebump imbalance.

Figure 6A:
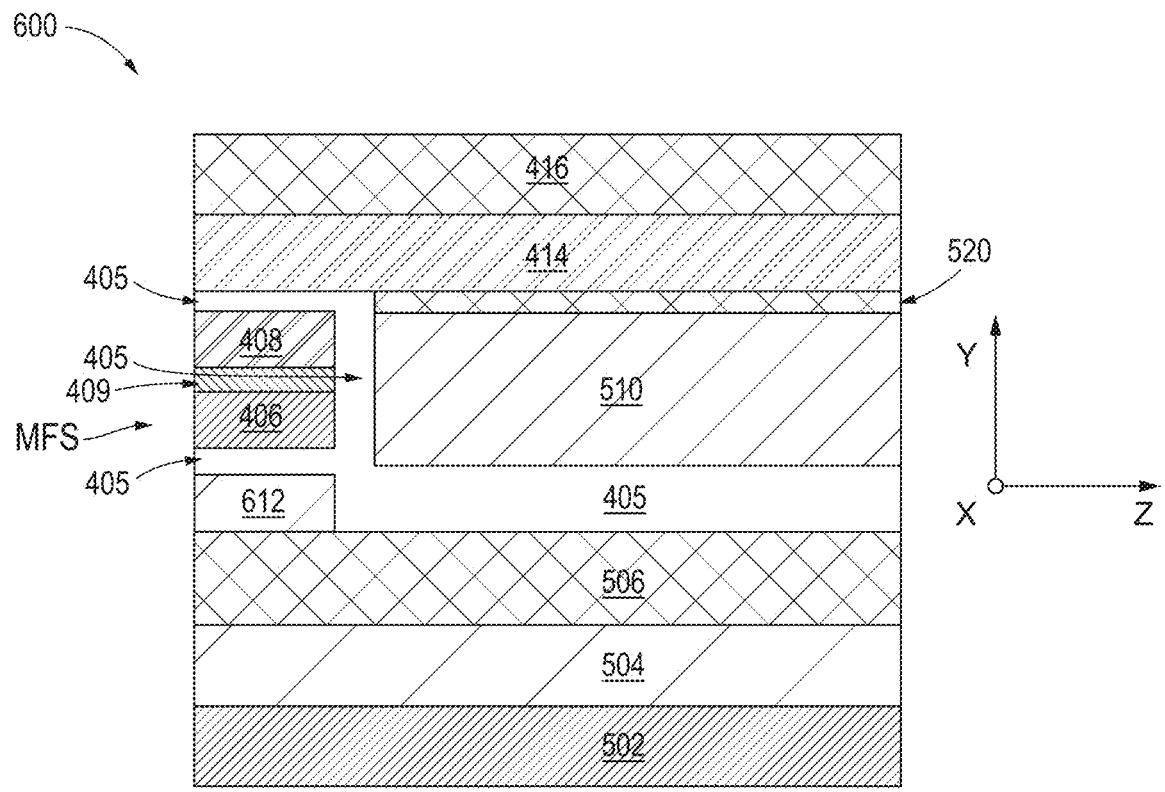
FIG. 6A is an apex view of a read head according to one embodiment.
Figure 6B:
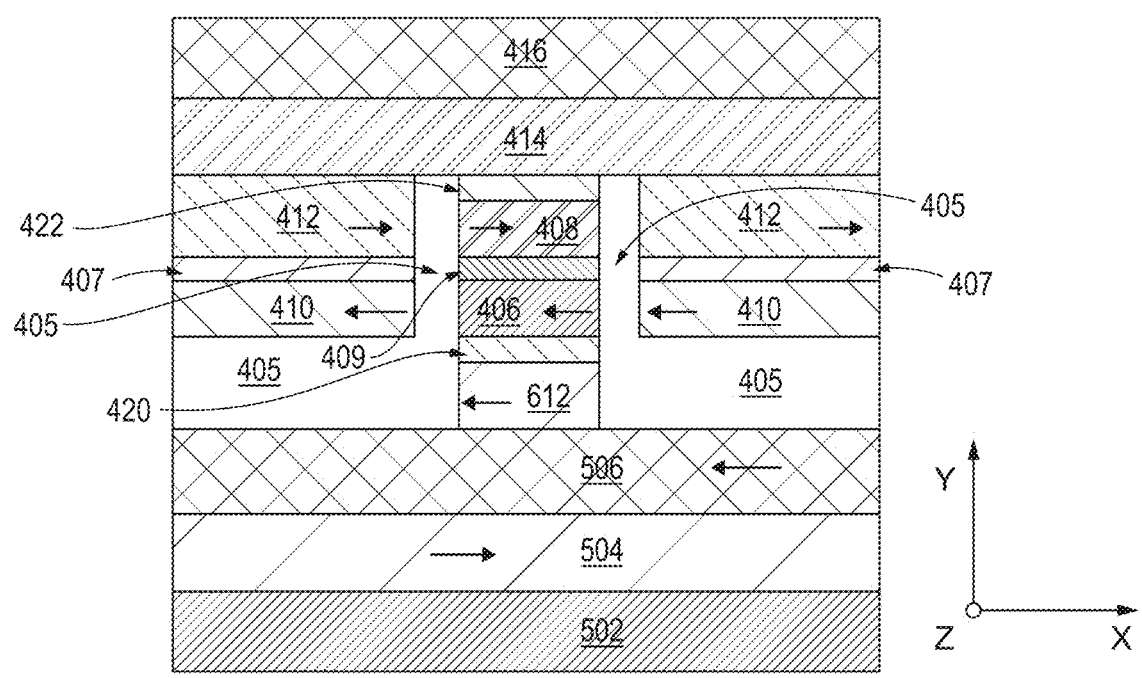
FIG. 6B is an MFS view of the read head of FIG. 6A.

FIG. 6A is an apex view of a read head 600 according to one embodiment. FIG. 6B is an MFS view of the read head 600 of FIG. 6A. Read head 600 is similar to read head 500 except that the second magnetic seed layer exists as a notch 612 only under the sensor stack, or more specifically, under the first free layer 406 but not under the soft bias structure or first soft bias layer 410, and not under the rear hard bias layer 510. Read head 500, by contrast, has the second magnetic seed layer 508 under the first free layer 406 as well as the first soft bias layer 410 and RHB layer 510. Hence, in read head 500, the entire shield is a pinned SAF shield. Read head 600, however, is a pinned SAF shield only at the location under the first free layer 406 while the remainder area of the shield is single pinned.

Stated another way, in read head 600, the second magnetic seed layer (as notch 612) has substantially the same width in the X direction at the MFS as the first free layer 406 and the second free layer 408. The second magnetic seed layer as notch 612 has substantially the same height in the Z direction at APEX as the first free layer 406 and the second free layer 408. Contrasting with read head 500, only the notch 512 has substantially the same width in the X direction at the MFS as the first free layer 406 and the second free layer 408, while the second magnetic seed layer 508 has a width in the X direction at the MFS that is greater than the first free layer 406 and the second free layer 408. As such, the first soft bias layer 410 is spaced from the AFC coupling layer 506 by insulating material 405 and not both the insulating material 405 and a second magnetic seed layer. Similarly, the read hard bias 510 is spaced from the AFC coupling layer 506 by insulating material 405 and not both the insulating material 405 and a second magnetic seed layer.

As a result of the pinned SAF shield notch and single pinned remainder of the shield, the second magnetic seed layer as notch 612's orientation is pinned in an orientation that is parallel to the orientation of the first free layer 406 (i.e., −X direction). Stated another way, because of the pinned SAF shield, the first magnetic seed layer 504 is pinned in the +X direction, the second magnetic seed layer as notch 612 is pinned in the −X direction, the first free layer 406 is biased in the −X direction by the first soft bias layer 410, and the second free layer is biased in the −+X direction by the second soft bias layer 412. The parallel orientations of the second magnetic seed layer as notch 612 and the first free layer 406 does not create the additive effect that occurs in FIG. 4A. Hence, the biasing of the first free layer 406 by the first soft bias layer 410 can be substantially reduced and can be equal to and opposite the biasing of the second free layer 408 by the second soft bias layer 412. In so doing, the sidebumps shown in FIG. 3, if existing at all, will be substantially identical in both amplitude and location in the cross track direction.

Figure 7:
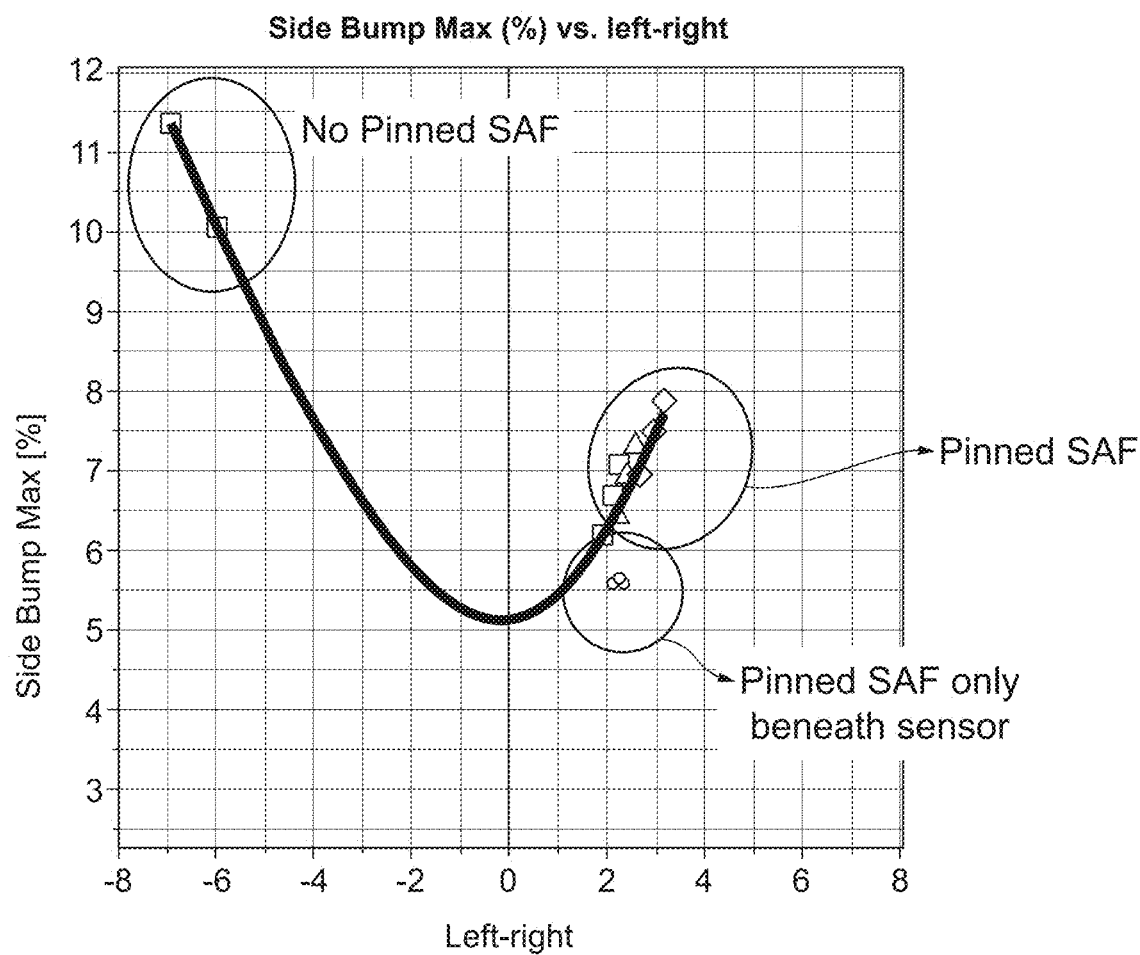
FIG. 7 is a graph illustrating the impact upon a sidebump maximum versus sidebump delta between the left and right bump.

FIG. 7 is a simulation result illustrating the impact upon a sidebump maximum versus sidebump delta. The graph shows how utilizing no pinning SAF (i.e., conventional shield) will lead to a larger maximum sidebump (left in this case) whereas using a pinned SAF (FIGS. 5A-5B's configuration) or a pinned SAF only beneath the sensor (FIGS. 6A-6B's configuration) will lead to a significant reduction in the sidebump imbalance and maximum.

Figure 8A:
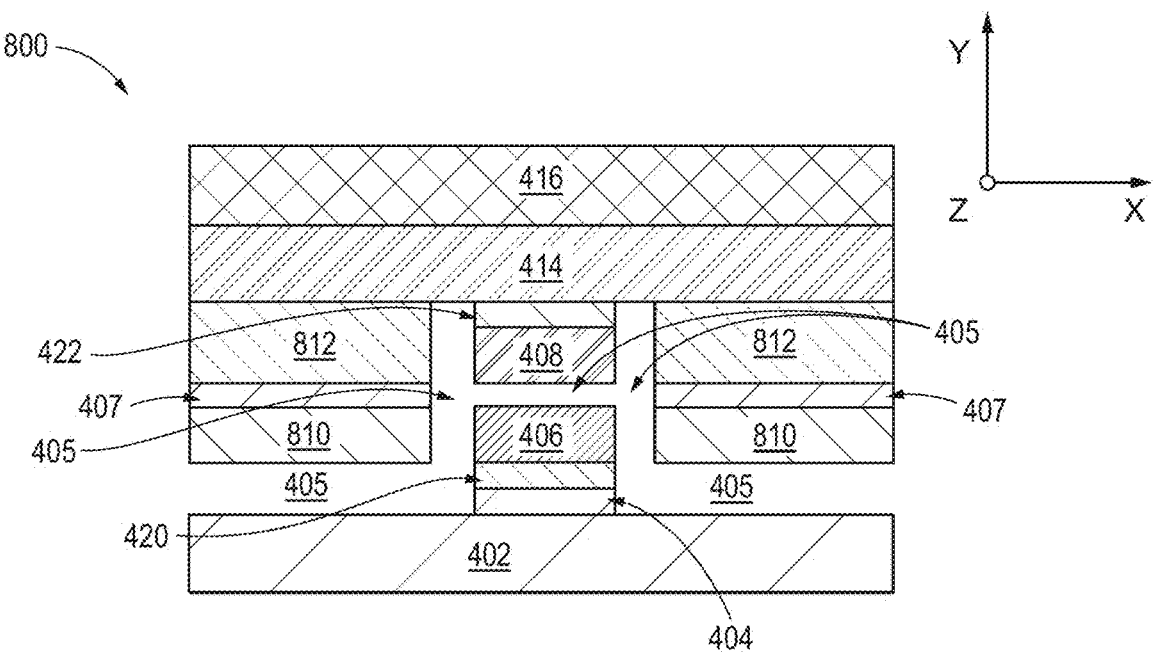
FIG. 8A is an MFS view of a read head according to another embodiment.

FIG. 8A is an MFS view of a read head 800 according to another embodiment. Rather than utilize a pinned SAF shield approach, read head 800 utilizes the magnetic moment of the soft bias structure to ensure any sidebumps are minimized and symmetrical. In read head 800, the first soft bias layer 810 has a first magnetic moment while the second soft bias layer 812 has a second magnetic moment, and the first magnetic moment is different from the second magnetic moment.

For read head 800, the fringe magnetic fields (from the notch 404) added to the bias from the first soft bias layer 810 creates a first bias in the first free layer 406. The bias from the second soft bias layer 812 creates a second bias in the second free layer 408. The first bias and the second bias are substantially equal even though the magnetic moments of the first soft bias layer 810 and second soft bias layer 812 are different. The different magnetic moments of the first soft bias layer 810 and second soft bias layer 812 may be accomplished by having different materials for the layers. More specifically, the first magnetic moment is smaller than the second magnetic moment.

Figure 8B:
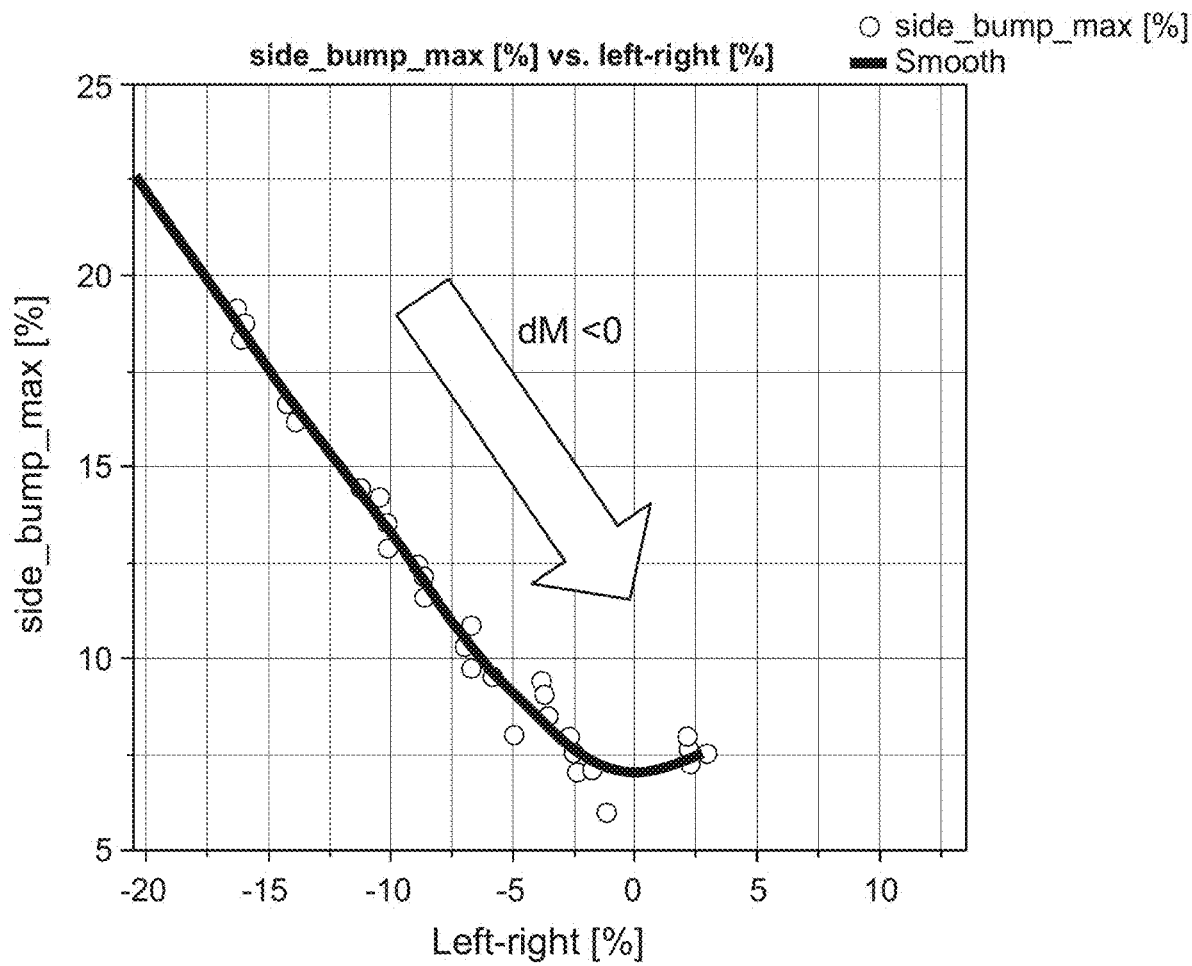
FIG. 8B is a graph illustrating a sidebump maximum reduction as well as sidebump imbalance in accordance with using different magnetic moments for the soft bias layers.

The configuration in FIG. 8A stands in contrast with read head 400, where the magnetic moment of the first soft bias layer 410 is substantially identical to the magnetic moment of the second soft bias layer 412. As discussed above, in read head 400, due to the fringe magnetic fields from the notch 404 added to the bias from the first soft bias layer 410, the first bias is greater than the second bias. While this addictive effect in the notch is also present in FIG. 8A, the difference in the magnetic moments of the first soft bias layer 810 and second soft bias layer 812 compensates for this effect to equalize the biasing difference between the first and second free layers and resulting in equal signal sidebumps. FIG. 8B is a graph illustrating a sidebump maximum reduction as well as bump imbalance shift towards zero when in accordance with using different magnetic moments for the soft bias layers. More specifically, smaller moment for the first bias layer than $2^{nd}$ soft bias layer (dM<0).

Figure 9A:
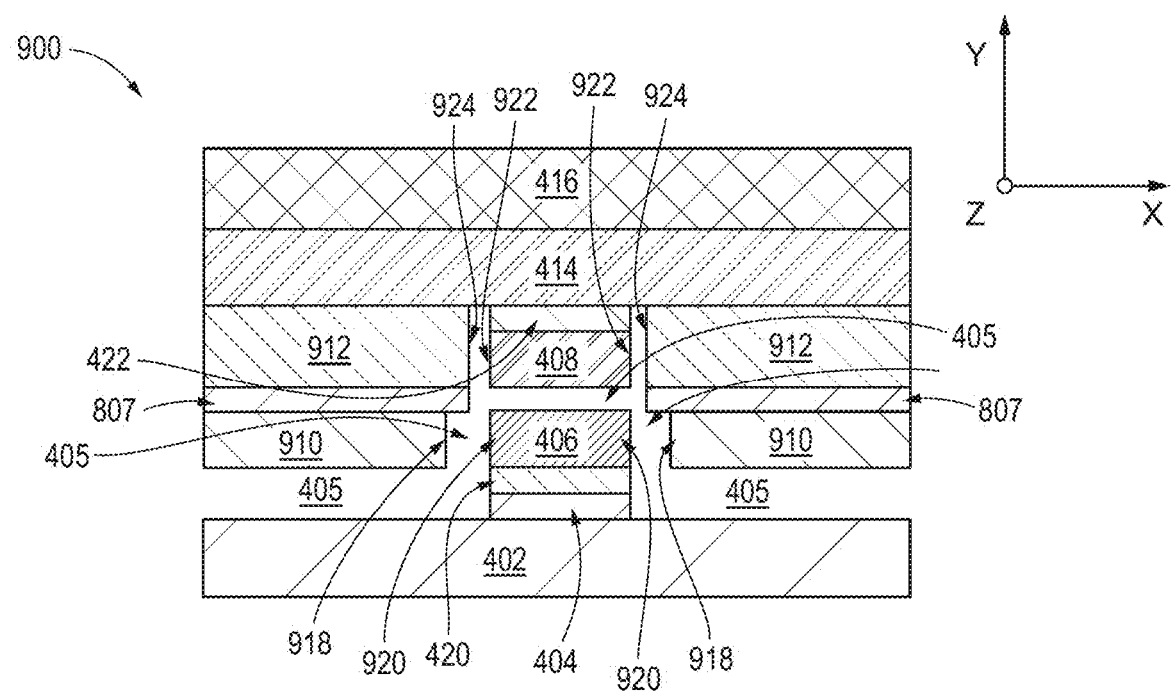
FIG. 9A is an MFS view of a read head according to another embodiment.

FIG. 9A is an MFS view of a read head 900 according to another embodiment. Rather than utilize a pinned SAF shield approach, read head 900 changes the separation distance between the first and second free layers 406, 408 and the first and second soft bias layers 910, 912 to ensure any sidebumps are minimized and symmetrical.

In read head 900, the first soft bias layer 910 has ends 918 that face ends 920 of the first free layer 406. The ends 918, 920 are spaced apart by insulating material 405 and a first distance. The second soft bias layer 912 has ends 924 that face ends 922 of the second free layer 408. The ends 922, 924 are spaced apart by insulating material 405 and a second distance. The second distance is different from the first distance, and in the embodiment shown in FIG. 9A, the second distance is less than the first distance. Additionally, the AFC layer 807 is spaced the second distance from the DFL sensor stack portion. Stated another way, both the second soft bias layer 912 and the AFC layer 807 have a greater width in the X direction at the MFS as compared to the first soft bias layer 910. The difference in the separation distance mitigates the above-discussed fringe field effect from the notch 404.

Figure 9B:
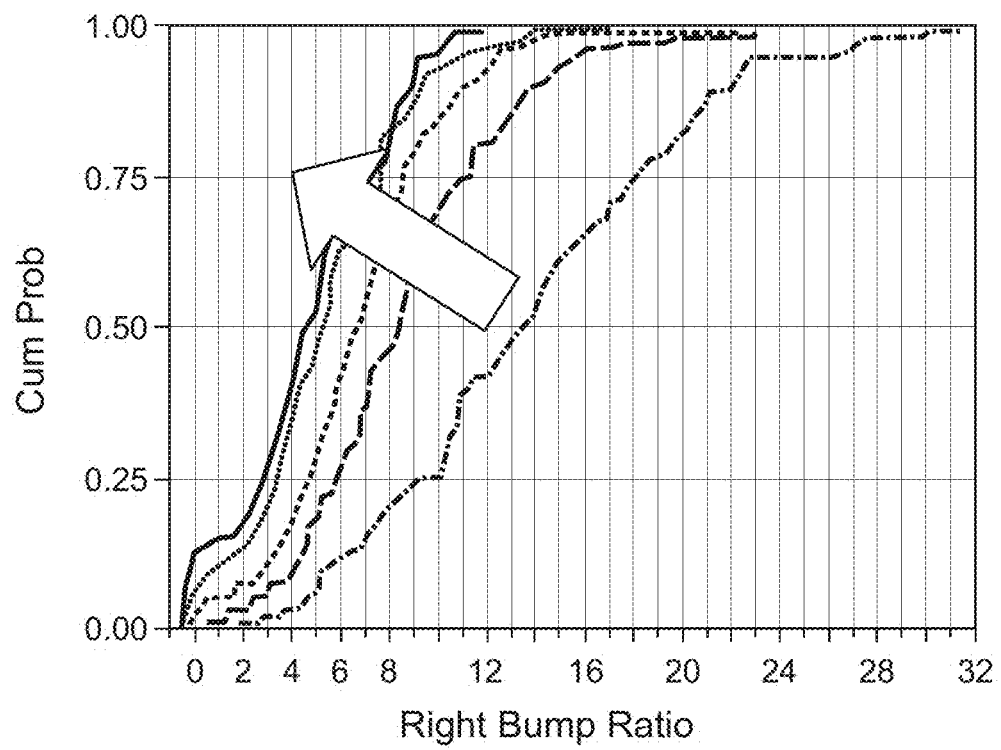
FIGS. 9B and 9C are graphs illustrating the impact upon the cumulative probability of the bump ratio for the right bump (FIG. 9B) and the left bump (FIG. 9C).
Figure 9C:
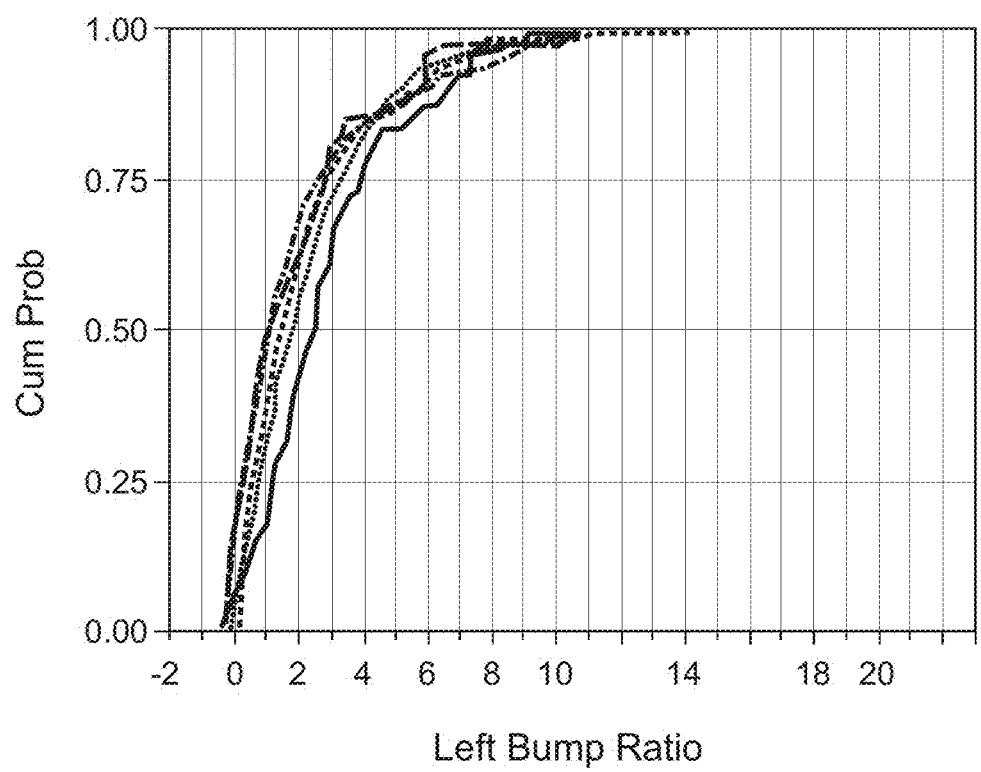

In some embodiments, the different separation distances are obtained by partially removing insulating material 405 from near the second free layer 408 to tune the spacing. FIGS. 9B and 9C are graphs illustrating the impact upon the cumulative probability of a bump ratio for the right bump (FIG. 9B) and the left bump (FIG. 9C). The more removal that occurs (as indicated by arrow direction in FIG. 9B for the smaller the second distance becomes, the stronger the second free layer 408 biasing becomes, the smaller the second free layer 408 biasing difference with the first free layer 406 biasing becomes, the more balanced the biasing becomes, and the more reduced the sidebumps become. There is little impact upon the first free layer 406 and hence no impact on left bump (FIG. 9C) because the removal may occur after forming the first soft bias layer 910 so that the first soft bias layer 910 can protect the insulating material 405 between the first soft bias layer 910 and the first free layer 406. In some embodiments, the general flow would be to define the first free layer 406 and second free layer 408 by material removal, deposit insulating material 405 and the first soft bias layer 910, remove insulating material on sidewalls of the second free layer 408, and then deposit the AFC layer 807 and second soft bias layer 910. In other embodiments, other fabrication methods and configurations may be used, as long as a difference in the separation distances described above is achieved to compensate for the notch fringe field effect.

It is contemplated that the pinned SAF shields may be combined with either the different magnetic moment option, the different distance option, or both to obtain symmetrical sidebumps. Similarly, it is contemplated that the different magnetic moment option may be combined with the different distance option to obtain symmetrical sidebumps. By utilizing a SAF shield, adjusting magnetic moments of SB layers, and/or adjusting spacing between the free layers of the DFL read head and the layers of the SB, DFL sidebumps are symmetric and can be minimized.

In one embodiment, a magnetic read head comprises: a synthetic antiferromagnetic (AFM) (SAF) shield; a first free layer disposed over the SAF shield; a barrier layer disposed on the first free layer; a second free layer disposed on the barrier layer; a soft bias structure disposed laterally, in a cross-track direction at a media facing surface (MFS), adjacent the first free layer and the second free layer; a rear bias structure recessed from the MFS; and a second shield disposed over the second free layer and the soft bias structure. The SAF shield comprises: an AFM layer; a first magnetic layer disposed on the AFM layer; an antiferromagnetic coupling layer disposed on the first magnetic layer; and a second magnetic layer disposed on the antiferromagnetic coupling layer, wherein the second magnetic layer is disposed below the rear bias structure. The SAF shield comprises: an AFM layer; a first magnetic layer disposed on the AFM layer; an antiferromagnetic coupling layer disposed on the first magnetic layer; and a second magnetic layer disposed on the antiferromagnetic coupling layer, wherein the second magnetic layer has a stripe height from the MFS that does not exceed an amount the rear bias structure is recessed from the MFS. The soft bias structure is disposed over the antiferromagnetic coupling layer. The SAF shield includes a notch. The SAF shield comprises: an AFM layer; a first magnetic layer disposed on the AFM layer and having a first width at a cross track direction at the MFS; an antiferromagnetic coupling layer disposed on the first magnetic layer; and a second magnetic layer disposed on the antiferromagnetic coupling layer and having a second width at the cross track direction at the MFS, wherein the first width is greater than the second width. The first free layer has a third width at the MFS and wherein the second width and the third width are substantially equal. A magnetic recording device comprising the magnetic read head is also contemplated.

In another embodiment, a magnetic read head comprises: a first shield; a first free layer disposed over the first shield; a first insulating layer disposed on the first free layer; a second free layer disposed on the first insulating layer; a soft bias structure disposed laterally, in a cross-track direction at a media facing surface (MFS), adjacent the first free layer and the second free layer, wherein the soft bias structure includes: a first soft bias layer having a first magnetic moment; and a second soft bias layer having a second magnetic moment different from the first magnetic moment; a rear bias structure recessed from the MFS; and a second shield disposed over the second free layer and the soft bias structure. The second soft bias layer is disposed over the first soft bias layer and wherein the second magnetic moment is greater than the first magnetic moment. The first shield includes a notch and wherein the notch has a width at the cross-track direction at the MFS substantially equal to a width of the first free layer at the MFS. The notch contributes additional biasing to the first free layer, and wherein the additional biasing plus biasing provided by the first soft bias layer to the first free layer is substantially equal to biasing provided to the second free layer by the second soft bias layer. The first soft bias layer comprises a first magnetic material, wherein the second soft bias layer comprises a second magnetic material that is different than the first magnetic material. The first soft bias layer is spaced a first distance from the first free layer, wherein the second soft bias layer is spaced a second distance from the second free layer, and wherein the first distance and the second distance are different. The first distance is greater than the second distance.

A magnetic recording device comprising the magnetic read head is also contemplated.

In another embodiment, a magnetic read head comprises: a first shield; a first free layer disposed over the first shield; a first insulating layer disposed on the first free layer; a second free layer disposed on the first insulating layer; a soft bias structure disposed laterally, in a cross-track direction at a media facing surface (MFS), adjacent the first free layer and the second free layer, wherein the soft bias structure includes: a first soft bias layer spaced a first distance from the first free layer; and a second soft bias layer spaced a second distance from the second free layer, wherein the second distance is different from the first distance; a rear bias structure recessed from the MFS; and a second shield disposed over the second free layer and the soft bias structure. The second distance is less than the first distance. The soft bias structure further includes a ruthenium layer disposed between the first soft bias layer and the second soft bias layer. The ruthenium layer is spaced the second distance from a second insulating layer disposed between the first free layer and the second free layer. The first soft bias layer has a first magnetic moment, wherein the second soft bias layer has a second magnetic moment, and wherein the first magnetic moment is substantially equal to the second magnetic moment. A magnetic recording device comprising the magnetic read head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head, comprising:
   a synthetic antiferromagnetic (AFM) (SAF) shield, wherein the SAF shield comprises a first magnetic layer, an antiferromagnetic coupling layer, and a second magnetic layer;
   a first free layer disposed over the SAF shield;
   a barrier layer disposed on the first free layer;
   a second free layer disposed on the barrier layer;
   a soft bias structure disposed laterally, in a cross-track direction at a media facing surface (MFS), adjacent the first free layer and the second free layer;
   a rear bias structure recessed from the MFS, wherein the second magnetic layer has a stripe height from the MFS that does not exceed an amount the rear bias structure is recessed from the MFS; and
   a second shield disposed over the second free layer and the soft bias structure.

2. The magnetic read head of claim 1, wherein the SAF shield comprises:
   an AFM layer, the first magnetic layer being disposed on the AFM layer;
   wherein the antiferromagnetic coupling layer is disposed on the first magnetic layer; and
   wherein the second magnetic layer is disposed on the antiferromagnetic coupling layer.

3. The magnetic read head of claim 2, wherein the soft bias structure is disposed over the antiferromagnetic coupling layer.

4. The magnetic read head of claim 1, wherein the SAF shield includes a notch.

5. The magnetic read head of claim 1, wherein the SAF shield comprises:
   an AFM layer;
   wherein the first magnetic layer is disposed on the AFM layer and has a first width in the cross-track direction at the MFS;
   wherein the antiferromagnetic coupling layer is disposed on the first magnetic layer; and
   wherein the second magnetic layer is disposed on the antiferromagnetic coupling layer and has a second width in the cross-track direction at the MFS, wherein the first width is greater than the second width.

6. The magnetic read head of claim 5, wherein the first free layer has a third width at the MFS and wherein the second width and the third width are substantially equal.

7. A magnetic recording device comprising the magnetic read head of claim 1.

8. A magnetic read head, comprising:
a synthetic antiferromagnetic (AFM) (SAF) shield, the SAF shield comprising:
an AFM layer;
a first magnetic layer disposed on the AFM layer;
an antiferromagnetic coupling layer disposed on the first magnetic layer; and
a second magnetic layer disposed on the antiferromagnetic coupling layer;
a first free layer disposed over the SAF shield;
a barrier layer disposed on the first free layer;
a second free layer disposed on the barrier layer;
a soft bias structure disposed laterally, in a cross-track direction at a media facing surface (MFS), adjacent the first free layer and the second free layer;
a rear bias structure recessed from the MFS, wherein the second magnetic layer has a stripe height from the MFS that does not exceed an amount the rear bias structure is recessed from the MFS; and
a second shield disposed over the second free layer and the soft bias structure.

9. The magnetic read head of claim 8, wherein the SAF shield includes a notch.

10. The magnetic read head of claim 8,
wherein the first magnetic layer has a first width in the cross-track direction at the MFS; and
wherein the second magnetic layer has a second width in the cross-track direction at the MFS, wherein the first width is greater than the second width.

11. The magnetic read head of claim 10, wherein the first free layer has a third width at the MFS and wherein the second width and the third width are substantially equal.

12. The magnetic read head of claim 8, wherein the soft bias structure is disposed over the antiferromagnetic coupling layer.

13. A magnetic recording device comprising the magnetic read head of claim 8.

\* \* \* \* \*